United States Patent [19]
Evans, Jr. et al.

[11] 3,806,835
[45] Apr. 23, 1974

[54] RAPIDLY PULSED, HIGH INTENSITY, INCOHERENT LIGHT SOURCE

[75] Inventors: John C. Evans, Jr., Kent; Henry W. Brandhorst, Jr., Berea, both of Ohio

[73] Assignee: The United States of America as represented by the Administrator of the National Aeronautics and Space Administration, Washington, D.C.

[22] Filed: Sept. 13, 1972

[21] Appl. No.: 288,856

Related U.S. Application Data

[62] Division of Ser. No. 848,403, July 29, 1968, which is a division of Ser. No. 487,929, Aug. 16, 1965, abandoned.

[52] U.S. Cl............ 332/7.51, 331/94.5 D, 315/211, 315/228
[51] Int. Cl............................................. H01s 3/09
[58] Field of Search............ 331/94.5 D; 315/241 R, 315/228, 223, 211; 332/7.51

[56] References Cited
UNITED STATES PATENTS
2,835,850   5/1958   Morel................................. 315/211
3,311,844   3/1967   Curcio............................ 331/94.5 P
3,270,296   8/1966   Maurer............................ 331/94.5 P
3,569,861   3/1971   Tucker et al..................... 331/94.5 R
3,413,567   11/1968  Hanwacker et al................ 332/7.51

FOREIGN PATENTS OR APPLICATIONS
947,568   1/1964   Great Britain................. 331/94.5 A Primary Examiner—Maynard R. Wilbur
Assistant Examiner—N. Moskowitz
Attorney, Agent, or Firm—N. T. Musial; G. E. Shook; J. R. Manning

[57] ABSTRACT

A rapid pulsing, high intensity, incoherent light is produced by selectively energizing a plurality of discharge lamps with a triggering circuit. Each lamp is connected to a capacitor, and a power supply is electrically connected to all but one of the capacitors. This last named capacitor is electrically connected to a discharge lamp which is electrically connected to the triggering circuit.

6 Claims, 3 Drawing Figures

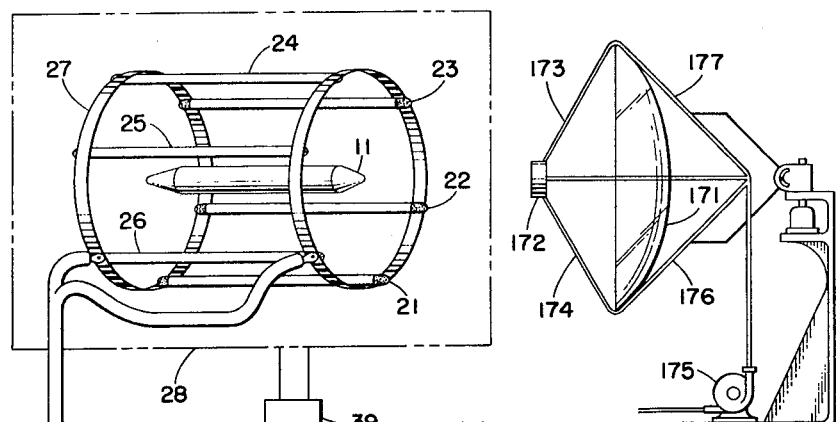
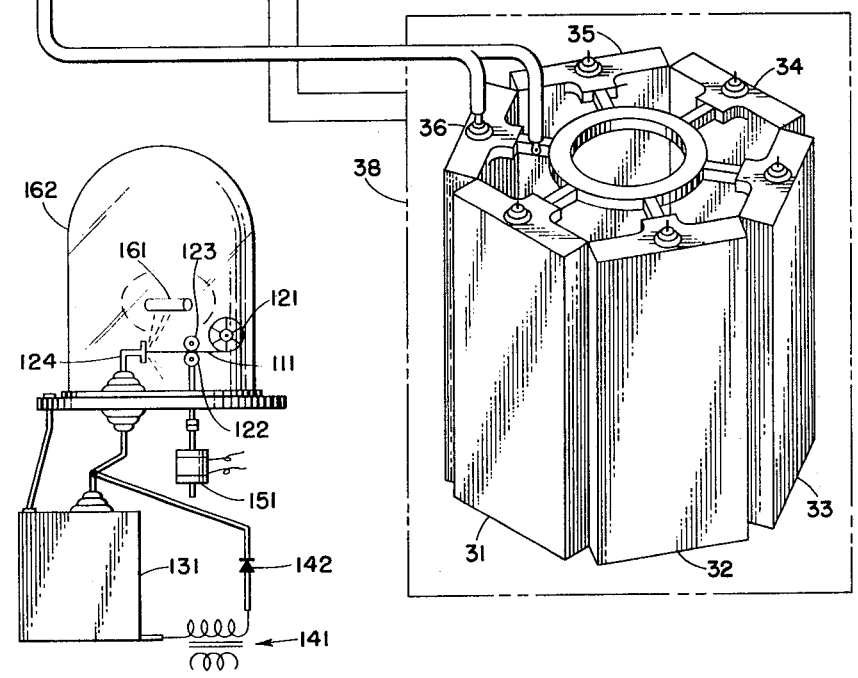
FIG. 2
FIG. 3

RAPIDLY PULSED, HIGH INTENSITY, INCOHERENT LIGHT SOURCE

RELATED APPLICATION

This application is a division of copending application Ser. No. 848,403, filed July 29, 1968 which, in turn, is a division of application Ser. No. 487,929, filed Sept. 16, 1965 and now abandoned.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention is concerned with a method and apparatus for producing a source of incoherent light capable of initiating laser action in laser material. The word laser is an acronym for the phrase "light amplification by stimulated emission of radiation." The instant invention is intended for particular use with lasers utilizing a solid laser material such as ruby to produce a narrow beam of coherent light.

The operation of the laser is based on the fact that the atomic systems represented by the molecules of the laser material can exist in any series of discreet energy levels or states. These systems absorb energy when going to a higher state and emit energy when going to a lower state. The atomic systems are raised from the lower or ground level to the higher of the three levels by irradiation from a strong light source which need not be coherent but should preferably have a high concentration of energy in the shorter wave length. The operation of raising the energy level of the laser to produce the desired photon emission is referred to in the art as optical pumping.

Optical pumping may be achieved by, for example, discharging a conventional capacitor into a xenon-filled flash lamp. The light output of the lamp is then sufficient to promote laser action. At the present time the light output of flash lamps is rated generally between 100–100,000 joules depending upon construction and design details. Conversion of this light into laser output is around 4 percent efficient and hence, laser beams up to 4000 joules can be obtained. Simultaneous flashing of several lamps is also in use.

Certain desired uses for lasers such as point to point power transmission, welding, rock drilling, and materials cutting would appear to require high energy density in the laser beam.

It has been proposed to increase the power output of a laser beam by increasing the power density of a single pulse laser. However, it would appear to be difficult to handle the giant pulse thus produced, and hence, such an arrangement would have very limited application.

SUMMARY OF THE INVENTION

These problems have been solved in accordance with the present invention by increasing the flashing rate of the source of incoherent light. More particularly, the lasers are fired more times per unit time interval. Increasing the flashing rate or firing rate of the source of incoherent light results in a series of low amplitude output pulses. The time integration of the energy content of these pulses yields a higher average power than a single giant pulse which, in turn, results in an increased laser output.

Several embodiments of the invention may be utilized to achieve repetitive pulsing wherein the laser is fired more times per unit. In one embodiment a plurality of six xenon flash tubes are circumferentially disposed around a laser rod and are fired repetitively in succession by the use of high speed motor connected to an automobile-type distributor which triggers a suitable firing circuit. The flash tubes are powered through a bank of fast charging capacitors. The apparatus is so arranged so that while one of the capacitors is discharging into one of the flash tubes and causing it to fire the other five capacitors are being charged.

Another embodiment of the invention involves an exploding wire mounted on a reel which is moved by high speed driving motor. The wire is mounted so as to pass through one of two electrodes and is movable towards the other electrode. When the wire comes into contact with the other electrode, a circuit is closed, producing thereby a high intensity flash of light.

Repetitive pulsing or increasing the output pulses per unit time results in a high power density beam for an extended period of time. By way of example, a repetition rate of 20 pulses per second for a 50 joule pulse will issue a kilowatt of laser power. However, a flashing rate of 1000 per second will result in a power output of 50 kilowatts.

OBJECTS OF THE INVENTION

It is, therefore, an object of the present invention to provide an improved method and apparatus for producing incoherent light. When this incoherent light is used for pumping a laser material, a high intensity light having a high pulsing rate is produced.

Another object of the invention is to provide an improved incoherent light for producing a laser output having a high average power density.

A further object of the invention is to provide an apparatus for easily controlling the output of a laser.

A still further object of the invention is to improve a laser apparatus having modest energy storage requirements and wherein capacitors forming a part of the power supply for the light source are capable of operation at higher frequencies.

A still further object of the invention is to provide for a laser apparatus wherein the size of the capacitor banks or the power supply are relatively small.

These objects and advantages of the invention will be apparent from the specification which follows and from the drawing wherein like numerals are used throughout to identify like parts.

DESCRIPTION OF THE DRAWINGS

FIG. 2 is a pictorial representation of a power transmission system using the energy transmitter of FIG. 1; and FIG. 3 is a view in elevation of another embodiment of a laser-type energy transmitter.

DESCRIPTION OF THE PREFERRED EMBODIMENT

Figure 1:
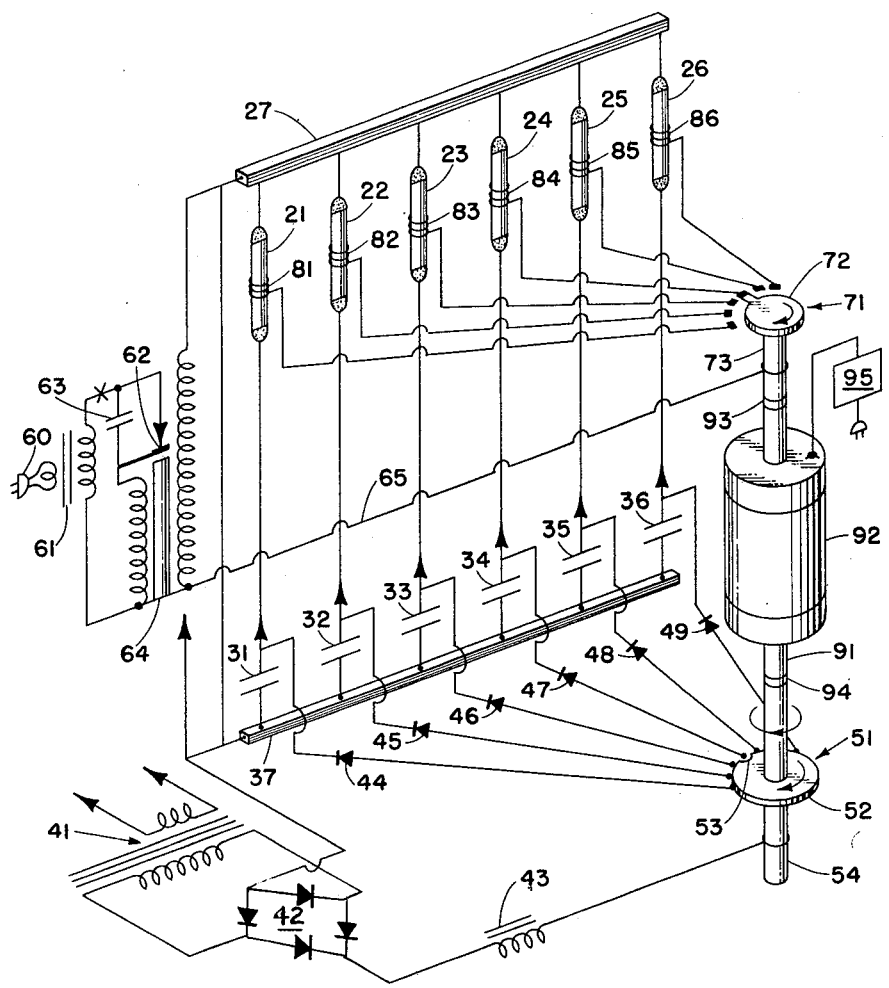
FIG. 1 is a combination pictorial and schematic view of one embodiment of a laser-type energy transmitter.

Referring now to FIGS. 1 and 2, there is shown in

FIG. 2 a cylindrically-formed crystal or rod 11 of a laser material, such as ruby. The crystal or rod 11 is preferably of the type shown in application Ser. No. 442,548 which was filed Mar. 24, 1965 and is now abandoned. This laser material is activated by a rapid pulsing light source.

In the preferred embodiment, the light source includes the plurality of six xenon discharge lamps 21 through 26, circumferentially surrounding the laser rod 11 and mounted on a common lamp bank 27. The six xenon discharge lamps 21 through 26 are each rated at 3000 watt seconds. The xenon discharge lamps 21 through 26 are arranged by a mechanical switching means so as to repetitively fire in succession.

The xenon discharge lamps 21 through 26 are energized by means of a capacitive-type discharge circuit and are triggered by means of an induction coil circuit. The capacitor-type energizing circuit and the induction coil triggering circuit are mechanically coupled to the xenon discharge lamps 21 through 26 so as to provide for repetitive firing in succession.

The capacitor energizing circuit includes six capacitors 31 through 36 connected to a common bank 37. Each one of the capacitors 31 through 36 is electrically connected to one of the xenon discharge lamps 21 through 26; i.e., capacitor 31 is electrically connected to xenon discharge lamp 21, etc. The capacitors 31 through 36 are preferably 15 mfd at 20 kv with a self inductance of 0.06 microhenries. The energy content of each capacitor 31 through 36 is approximately 3000 joules.

The capacitor bank 37 is powered by means of a power supply circuit including a high voltage power transformer 41 connected to a full bridge rectifier 42 which in turn is connected to a charging reactor 43. The full bridge rectifier 42 converts the alternating current to direct current and the charging reactor 43 limits the charging current to a safe value. Power from the charging reactor 43 is transmitted to the capacitor bank 37 through a commutator-type switch 51. Diodes 44 through 49 prevent current from flowing back to the power supply. The switch includes a rotating member 52 having a cutaway portion 53 and adapted thereby to contact and transmit current to all but one of the capacitors. The rotating member 52 is mounted on an electrically conductive shaft 54.

The induction coil triggering circuit has a plug 60 and includes a step down transformer 61, an interrupter 62, a capacitor 63, and an induction coil 64. The plug 60 is adapted to be connected to a source of voltage. Power from the induction coil triggering circuit is selectively transmitted through an electrical conductor 65 from a switch 71 to a plurality of six trigger coils 81 through 86 which are connected respectively to the six discharge lamps 21 through 26.

The switch 71 which may be in the form of an automobile distributor-type switch which is electrically conductive and the power supply (or commutator) switch 51 are mechanically coupled by means of a drive shaft 91 which is turned by means of a variable speed motor 92 which may be regulated by a variable speed control means 95 such as silicon controlled rectifiers or thyratrons. Couplings 93 and 94 electrically separate the commutator switch 51 and the distributor switch 71. The switch 71 includes a disc 72 mounted on an electrically conductive shaft 73.

By means of this coupling arrangement at any one interval of time, one of the xenon discharge lamps 21 through 26 will be firing.

For example, with the switches in the position shown in the embodiment in FIG. 1 capacitors 31, 32, 33, 35 and 36 are being charged. At the same time the induction coil triggering circuit is connected through the automobile-type distributor switch 71 to trigger coil 84 which is connected to the xenon discharge lamp 24. The gas in the lamp 24 is ionized providing an electrical path and causing the capacitor 34 connected across said lamp 24 to discharge and the lamp 24 to thereby flash brightly. During this flashing time all the other capacitors, i.e. 31, 32, 33, 35 and 36 are charging and as the distributor shaft 91 rotates, another trigger coil is energized and another lamp is fired.

In FIG. 2 is shown in simplified form an entire system for transmitting power utilizing the laser apparatus of FIG. 1. It should be noted however, that the laser apparatus of FIG. 3 could also be employed. Although not shown in FIG. 2 the distributors and attendant power supplies are physically located in the center of the capacitor bank. The capacitor is enclosed within a coolant tank 38. Circumferentially disposed around the laser rod 11 are the six flash tubes 21 through 26. The entire laser assembly is also enclosed within a cooling chamber 28. Recirculating pump 39 connects the coolant tank 38 to the laser chamber 28.

The coherent light emitted from the laser transmitter is collected at a distant point by an energy collector in the form of a parabolic reflector 171 having at its focus a plurality of high current solar cells 172. These solar cells 172 are mounted at the focal plane of and supported from the reflector by means of tubes 173 and 174 which also serve as coolant channels. These channels 173 and 174 carry a coolant from a pump and tank 175. The coolant is transmitted to channel 173 through a mirror support 176 which is also a channel and is carried back from this channel 174 through mirror support 177.

DESCRIPTION OF AN ALTERNATE EMBODIMENT

In FIG. 3 is shown another embodiment of the instant invention wherein repetitive flashing is obtained by means of an exploding wire. In this embodiment a length of wire 111 mounted on a wire reel 121 is fed through a pair of rollers 122, 123 and moved in a direction of a firing block 124 which is spaced apart from the rollers 122, 123. When the wire 111 comes into contact with the firing block 124 a circuit consisting of a bank of rapid cycling high voltage capacitors 131 connected to the firing block 124 and the rollers 122, 123 is completed and the bank of high voltage capacitors 131 are discharged causing the wire 111 to explode. While the free end of the wire 111 is moving toward the firing block 124, the bank of high voltage capacitors 131 is being charged through a high frequency power supply 141. The feed system includes a drive motor 151 mechanically connected to the rollers. A blocking diode 142 is connected between the high frequency power supply 141 and the bank of high voltage capacitors 131. The wire 111 and laser rod 161 are enclosed in a vacuum chamber 162.

Obviously, many modifications and variations of the present invention are possible in light of the above teachings. It is therefore to be understood that, within

What is claimed is:

1. Apparatus for producing rapid pulsing, high intensity, incoherent light for use in optically pumping a body of laser material comprising
   a plurality of gaseous discharge lamps surrounding said body of laser material, and
   electromechanical means connected to said gaseous discharge lamps for continuously firing each of said gaseous discharge lamps in succession, said electromechanical means including
   a capacitor electrically connected to each of said gaseous discharge lamps,
   triggering circuit means for providing a high voltage and adapted to be selectively connected to each one of said gaseous discharge lamps,
   power supply means electrically connected to each one of said capacitors for charging said capacitors, and
   mechanical switching means for simultaneously opening the circuit between the power supply means and one of said capacitors while closing the triggering circuit means connecting said gaseous discharge lamp to said same capacitor.

2. Apparatus for producing rapid pulsing, high intensity, incoherent light as claimed in claim 1 wherein said mechanical switching means comprise
   a drive shaft,
   variable speed motor connected to said drive shaft for turning said drive shaft,
   a distributor mounted on each end of said drive shaft,
   means connecting one of said distributors to said plurality of capacitors, and
   means connecting said other distributor to said plurality of gaseous discharge lamps.

3. Apparatus for producing rapid pulsing, high intensity, incoherent light as claimed in claim 2 including
   means for electrically connecting the power supply means to said distributor shaft, and
   means for electrically connecting the triggering circuit means to said distributor shaft.

4. Apparatus for producing rapid pulsing, high intensity, incoherent light as claimed in claim 1 wherein the energy content of each capacitor is about 3000 joules.

5. Apparatus for producing rapid pulsing, high intensity, incoherent light as claimed in claim 4 wherein each capacitor is 15 mfd at 20 kv with a self inductance of 0.06 microhenries.

6. A method of producing rapid pulsing, high intensity, incoherent light for optically pumping a body of material capable of producing coherent light comprising the steps of
   electrically connecting a capacitor to each of a plurality of gaseous discharge lamps,
   repetitively firing each of said gaseous discharge lamps in succession at a high rate around said body of material capable of producing coherent light by sequentially discharging the capacitors into their respective gaseous discharge lamps thereby causing said lamp to fire, and
   charging the remaining capacitors while each capacitor is being fired.

* * * * *